United States Patent
Auracher

[11] 3,990,777
[45] Nov. 9, 1976

[54] NON-RECIPROCAL COMPONENT ELEMENT FOR INTEGRATED OPTICS

[75] Inventor: Franz Auracher, Munich, Germany

[73] Assignee: Siemens Aktiengesellschaft, Berlin & Munich, Germany

[22] Filed: Nov. 3, 1975

[21] Appl. No.: 628,417

[30] Foreign Application Priority Data
Nov. 5, 1974  Germany............................ 2452489

[52] U.S. Cl. ........................ 350/96 WG; 350/96 C; 350/151
[51] Int. Cl.²............................................ G02B 5/14
[58] Field of Search ..................... 350/96 WG, 96 C

[56] References Cited
OTHER PUBLICATIONS

Wang et al. "Studies of the Use of Gyrotropic & Anisotropic Material for Mode Conversion . . ." Jour. of Appl. Phys. vol. 43, No. 4, Apr. 1972, pp. 1861–1875.
Auracher et al. "New Directional Couples for Integrated Optics," Journ. of Appl. Phys. vol. 45, No. 11, Nov. 1974, pp. 4997–4999.

Primary Examiner—John K. Corbin
Assistant Examiner—Stewart Levy
Attorney, Agent, or Firm—Hill, Gross, Simpson, Van Santen, Steadman, Chiara & Simpson

[57] ABSTRACT

A non-reciprocal component element for integrated optics characterized by a substrate having a pair of waveguides disposed thereon either in a stacked relationship or a closely spaced side-by-side relationship with one of the pair of waveguides being of a magneto-optic material having an index of refraction greater than the index of refraction of the substrate. The component has a magnetic field extending in the plane of the waveguides and perpendicular to the direction of propagation of the waves therein. The component is preferably provided with a pair of 3dB couplers and in one embodiment, the magnetic field is controllable so that the element acts as a modulator.

7 Claims, 3 Drawing Figures

NON-RECIPROCAL COMPONENT ELEMENT FOR INTEGRATED OPTICS

BACKGROUND OF THE INVENTION

1. Field of the Invention

The present invention is directed to a non-reciprocal component element for integrated optics which element is particularly useful as an isolator, a directional coupler and/or a modulator for the waves carried in the component.

2. Prior Art

In microwave technology, non-reciprocal component elements are known. For example, a hollow metallic waveguide for the advancing and returning of microwaves is provided with a pre-magnetized ferrite body to form a ferrite phase shifter. A non-reciprocal property of the ferrite shifter influences the propagation constant such that the phase shifts for the advancing and returning electro-magnetic waves are different.

In optical transmission technology, as in microwave technology, non-reciprocal component elements are necessary. Isolators are particularly necessary in the case of optical transmission paths which contain optical amplifiers, such as lasers, in order to prevent the amplification of reflected optical signals and thus to prevent oscillation of the optic amplifiers. Embodiments of the integrated optics for such a component are discussed in the following two articles: John Warner "Faraday Optical Isolator/Gyrator Design in Planar Dielectric Waveguide Form" *IEEE Transactions on Microwave Theory and Techniques*, Vol. MTT 21, No. 12, December 1973, pp. 769–775, and Shyh Wang et al. "Studies of the Use of Gyrotropic and Anisotropic Materials for Mode Conversion in Thin-Film Optical-Waveguide Applications" *Journal of Applied Physics*, Vol. 43, No. 4, April 1972 pp. 1861–1875. However, these embodiments have the disadvantage in that they require a phase adaptation between the gyrotropic and the anistropic material over a length of several millimeters.

SUMMARY OF THE INVENTION

The present invention is directed to a non-reciprocal component element for integrated optics having isotropic gyromagnetic films in which a phase matching to optic anisotropic materials is not required. To accomplish this task, the non-reciprocal component element comprises a substrate with a pair of waveguides arranged thereon in close spaced relationship to each other with one of the waveguides being a transparent magneto-optic layer, which is either ferro-or paramagnetic, with an index of refraction greater than the index of refraction of the substrate and the component element having a magnetic field in the plane of the layer and extending perpendicular to the direction of propagation of the waves therein. Preferably, two 3dB couplers are arranged on the waveguides and the magnetic field is controllable so that the component element acts as a modulator.

DESCRIPTION OF THE PREFERRED EMBODIMENTS

Figure 1:
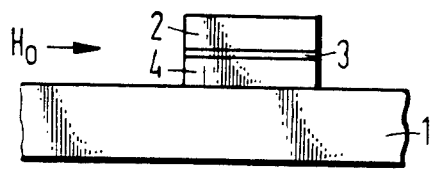
FIG. 1 is a cross-sectional view of a component element in accordance with the present invention.

The principles of the present invention are particularly useful in a non-reciprocal component element such as illustrated in cross section in FIG. 1. The component element has a substrate 1 with an index of refraction $n_1$, a waveguide 4 disposed on a surface of the substrate 1 having an index of refraction $n_4$, a waveguide 2 which is illustrated as being disposed on the waveguide 4 and separated by a thin layer 3 of dielectric material.

The substrate 1 with an index of refraction $n_1$ will act as a cladding for the dielectric surface waveguides. The substrate should have an index of refraction $n_1$, which, if possible, is 10 to 20% lower than $n_4$ which is the index of refraction for the waveguide 4. The substrate should make it possible for the application by an epitaxial growth of a garnet layer which may be used in forming at least a portion of the waveguide 4. One of the many known possibilities is for example $Gd_3Ga_5O_{12}$ as the substrate ($n_1 \approx 1.945$) and for example $(LaY)_3Ga_xFe_{5-x}O_{12}$ as a garnet layer wherein ($0<x<1$).

The reciprocal waveguide 2 may consist of an arbitrary and as low as possible dielectric but not a magneto-optic material whose index of refraction $n_2$ is somewhat greater than $n_1$ such as by several tenths of a percent to several percent. Examples of the material for the layer 2 are $ZnS$, $CeO_2$. With the index of refraction $n_2$ of the layer 2 being larger than $n_1$, the substrate can function as a sheathing for the reciprocal waveguide 2. In principle, it is always possible to select $n_2<n_1$; however, in the case a thin approximately 0.5 $\mu$m thick dielectric intermediary layer having an index of refraction less than $n_2$ must be provided between the waveguide 2 and the substrate 1.

The thin dielectric layer 3, which is approximately 0.5 $\mu$m to 1 $\mu$m in thickness, has an index of refraction $n_3<n_2$, $n_4$. An example is any type of glass with $n_3$ approximately 1.5. The magneto-optic waveguide 4 may be a garnet layer such as GdFeG or $(LaY)_3Ga_xFe_{5-x}O_{12}$ where $0<x<1$.

By a non-reciprocal (dielectric) waveguide, one understands a waveguide exhibiting non-reciprocal properties. For example, the material behaves differently for an advancing electro-magnetic wave than for a returning electro-magnetic wave. Such materials are, for example, plasmas, ferro- or paramagnetic materials with ferrites being used in microwave regions and garnets being used for optical wavelengths. The materials must be pro-poled (biased) with a static magnetic field in order that they show non-reciprocal properties, for example, Faraday rotation.

The magneto-optic waveguide 4 exhibits the properties that advancing or return TM-waves have different propagation constants. The component element according to the invention consists of such a magneto-optic waveguide 4 which is coupled to a second reciprocal waveguide 2 over a specific distance via 3dB couplers 6 and 7. If light energy is coupled into the reciprocal waveguide 2, the energy is uniformly distributed over both waveguides 2 and 4 by means of the first 3dB coupler 6. By correctly choosing the index of refraction and the length of the waveguides between the 3dB couplers for example as described in Auracher et al.

"New Directional Couplers for Integrated Optics", *Journal of Applied Physics*, Vol. 45, No. 11, November 1974, pp. 4997-4999, and for example 4mm for a GdFeG or 25 mm for $(LaY)_3Ga_xFe_{5-x}O_{12}$, the entire energy is carried in one of the waveguides after passing through the second 3dB coupler 7.

Figure 3:
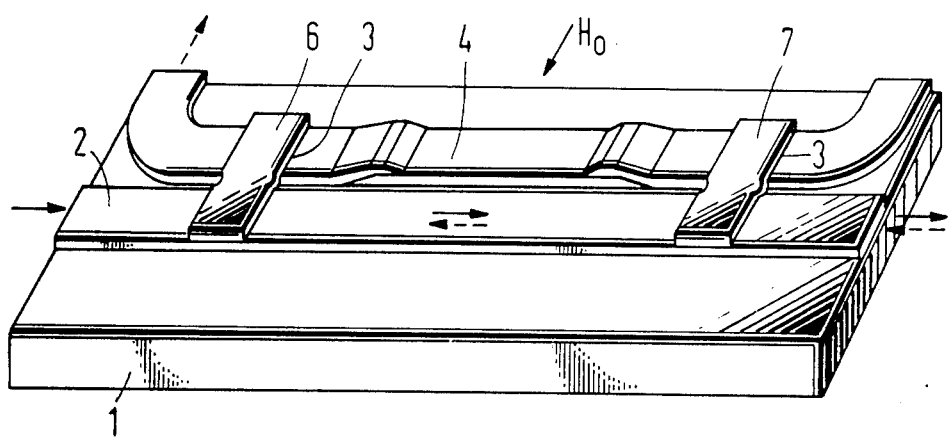
FIG. 3 is a perspective view of an embodiment of the component element in accordance with the present invention.

In the region of the 3dB couplers 6 and 7, phase matching of both coupled waveguides is necessary. It is therefore, expedient to manufacture the coupled waveguides in this region out of the same material. The precise limitations of the coupling length can, for example, be achieved by making the propagation constant outside of the coupler different by applying or omitting a covering layer, for example, of the same material as the substrate or a material which has an index of refraction as close as possible to that of the substrate (see an article by F. Zernicke et al. Topical Meeting on Integrated Optics, New Orleans, La., Jan. 21 - 24, 1974). The transition from one of these waveguides to the magneto-optic waveguide can, for example, be carried out by means of a taper. For example, a garnet for optical wavelengths as illustrated in FIG. 3.

If the length of the magneto-optic waveguide between the 3dB couplers and the strength of the magnetic field H$o$ is selected in such a way that the phase shift or displacement in a magneto-optic waveguide of the returning TM wave differs from that of the advancing wave by 180°, the energy distribution of the returning wave at the end of the component element is opposite to that of the advancing wave and after passing through the isolator, the entire energy in the return direction is carried in the second (first) waveguide. In the case of the ferro-magnetic materials, H$o$ is selected to be equal to the saturation magnetization (approximately 1000 A/cm). In the case of para-magnetic materials, it is selected to be as high as it is possible from a practical point of view in order that the Faraday rotation/cm becomes as high as possible. If the magnetic field H$o$ is controllable, then the coupling component can also be used as a non-reciprocal modulator or switch. In order to use the component as a modulator it can be mounted in a magnetic field whose intensity and/or direction can be changed, e.g. by moving or turning a permanent magnet or by varying the magnitude and/or direction of the current in an electromagnetic coil.

Figure 2:
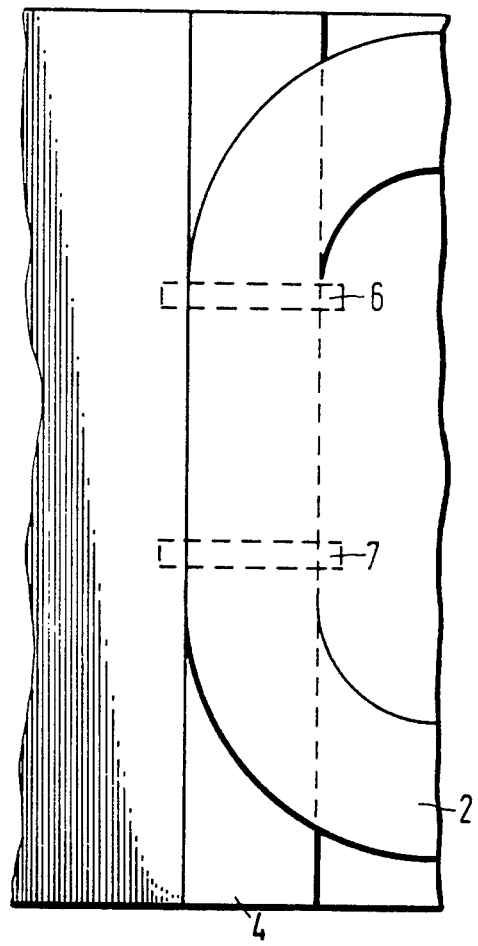
FIG. 2 is a plan view of the component element illustrated in FIG. 1.

In FIGS. 1 and 2, the two coupled waveguides are illustrated as being in a stacked relationship. The two coupled waveguides may also be arranged next to one another (FIG. 3). In the case of waveguides arranged one on top of another or in a stacked arrangement, the coupling strength is best determined by the thin intermediate layer 3 with $n_3 < n_2, n_4$. In the case of waveguides arranged next to one another, the distance between the two waveguides will determine the coupling strength. It is likewise possible to couple the two waveguides by means of a third waveguide of a suitable length and material for example consisting of a garnet so that the requirements for phase matching can be greatly reduced. Such an arrangement is illustrated in FIG. 3.

It also appears expedient to manufacture the substrate of the reciprocal waveguide 2 out of an electro-optic material in order to be able to finely tune the phase differences between the two waveguides by means of an electric field applied to this material via metallic electrodes. For this purpose, the waveguie 2 in FIG. 3 is manufactured out of electro-optical material for example $LiNbO_3$ or $LiTaO_3$ and in such a way that the c-axis lies perpendicular to the direction of propagation of the light carried in the waveguide 2 and parallel to the substrate plane. The metal electrodes are mounted on both sides of the waveguide 2. By applying an electric voltage to these electrodes, the index of refraction and thus the propagation constant in the $LiNbO_3$ ($LiTaO_3$) waveguide is changed by way of the linear electro-optic effect and makes possible the fine tuning of the optical length.

Although various minor modifications might be suggested by those versed in the art, it should be understood that I wish to employ within the scope of the patent granted hereon, all such modifications as reasonably and properly come within the scope of my contribution to the art.

I claim:

1. A non-reciprocal component element for integrated optics in particular for use as an isolator, directional coupler, and modulator for guided waves, said element comprising a substrate having an index of refraction of $n_1$, a magneto-optic layer, and a waveguide layer disposed on said substrate in spaced relationship to each other, said magneto-optic layer having an index of refraction $n_4 > n_1$ and said component having a magnetic field in the plane of the layer and extending perpendicular to the direction of propagation of the waves therein.

2. A non-reciprocal component element according to claim 1, in which said magnetic field is a controllable magnetic field so that the element becomes a modulator.

3. A non-reciprocal component element according to claim 1, which includes two 3dB couplers disposed on the waveguides.

4. A non-reciprocal component element according to claim 3, in which further said magnetic field is a controllable magnetic field so that the non-reciprocal component element acts as a modulator.

5. A non-reciprocal component element for use as an isolator, directional coupler, and modulator comprising a substrate having a first and second waveguide arranged in spaced relationship to each other thereon, said substrate having an index of refraction $n_1$, said first waveguide being of magneto-optic material having an index of refraction of $n_4 > n_1$, said component having a magnetic field extending in the plane of said first waveguide and perpendicular to the direction of propagation of the waves therein.

6. A non-reciprocal component element according to claim 5, wherein said first and second waveguides are in a stacked relationship separated by a thin dielectric layer having an index of refraction less than the index of refraction of the first and second layers, and wherein the coupling zone is defined by a pair of spaced 3dB couplers engaging at least one of said waveguides.

7. A non-reciprocal component element according to claim 5, wherein the first and second waveguides are disposed on the surface of the substrate in close parallel arrangement and includes a pair of 3dB couplers extending across the pair of waveguides, said 3dB couplers being spaced from the first and second waveguides by a thin dielectric layer.

* * * * *